United States Patent
McNamara et al.

(10) Patent No.: US 10,851,914 B2
(45) Date of Patent: Dec. 1, 2020

(54) BILAYER MICROVALVE ARRAYS FOR PNEUMATIC AND FLUIDIC APPLICATIONS

(71) Applicant: University of Louisville Research Foundation, Inc., Louisville, KY (US)

(72) Inventors: Shamus McNamara, New Salisbury, IN (US); Joseph Devin Schneider, Los Angeles, CA (US)

(73) Assignee: UNIVERSITY OF LOUISVILLE RESEARCH FOUNDATION, INC., Louisville, KY (US)

( * ) Notice: Subject to any disclaimer, the term of this patent is extended or adjusted under 35 U.S.C. 154(b) by 0 days.

(21) Appl. No.: 16/402,693

(22) Filed: May 3, 2019

(65) Prior Publication Data

US 2019/0257444 A1    Aug. 22, 2019

Related U.S. Application Data

(62) Division of application No. 15/388,332, filed on Dec. 22, 2016, now Pat. No. 10,288,191.

(Continued)

(51) Int. Cl.
*F16K 11/20* (2006.01)
*F16K 99/00* (2006.01)

(52) U.S. Cl.
CPC ...... *F16K 99/0042* (2013.01); *F16K 99/0015* (2013.01); *F16K 2099/008* (2013.01); *F16K 2099/0082* (2013.01)

(58) Field of Classification Search
CPC ........... F16K 99/0042; F16K 2099/008; F16K 99/0015; H01H 2059/0081; G08B 6/00
See application file for complete search history.

(56) References Cited

U.S. PATENT DOCUMENTS 3,989,357 A ‡ 11/1976 Kalt ................. G02B 26/02
                                          359/23
5,233,459 A ‡ 8/1993 Bozler ............. G02B 26/02
                                          345/48

(Continued)

OTHER PUBLICATIONS

Cardenas-Valencia, et al.; Development of various designs of low-power, MEMS valves for fluidic applications; Article; Sensors and Actuators A: Physical; 2007; pp. 374-384; 136; www.sciencedirect.com; www.elsevier.com; © 2007 Elsevier B.V.‡

(Continued)

*Primary Examiner* — Reinaldo Sanchez-Medina
(74) *Attorney, Agent, or Firm* — Wyatt, Tarrant & Combs, LLP; Stephen C. Hall; Max E. Bridges (57) ABSTRACT

A strained bilayer film with reinforcing members is used to open and close gas flow outlets in a microvalve array. The bottom layer of the bilayer film is compressive and the top layer is tensile. Reinforcing members are made from compressive material that accomplishes the dual objectives of reducing potential defects at the interface between the anchor region and the free region of the actuator, and controlling the stresses along the edges of the strained bilayer to avoid curling as the actuator unrolls from its normal coiled configuration in response to an applied voltage. Because of the configuration, the strained bilayer film occupies a minimal amount of space compared to other systems when the valve is opened, and it permits a higher density of microvalves to be utilized. Optional supports are provided over gas flow channel openings to increase the area over which the voltage is applied, increasing electrostatic stability of the actuators in maintaining their unrolled state for a variety of uses. Such uses include, but are not limited to, pneumatic manifolds or other practical uses that involve transmission of air or fluids, including for lab-on-a-chip applications, as well as for providing air flow channels for (Continued)

a configurable tactile tablet to provide the visually impaired with a tactile representation of shapes and designs, to name some examples.

13 Claims, 10 Drawing Sheets

Related U.S. Application Data (60) Provisional application No. 62/387,258, filed on Dec. 23, 2015.

(56) References Cited

U.S. PATENT DOCUMENTS

| | | | | |
|---|---|---|---|---|
| 6,032,923 | A ‡ | 3/2000 | Biegelsen | B65H 5/228 137/599.07 |
| 6,590,267 | B1 ‡ | 7/2003 | Goodwin-Johansson | B81B 3/0021 257/414 |
| 6,807,892 | B2 ‡ | 10/2004 | Biegelsen | F15B 15/10 91/454 |
| 7,014,165 | B2 ‡ | 3/2006 | Ji | F15C 5/00 251/129.01 |
| 7,448,412 | B2 * | 11/2008 | Teach | F15C 5/00 137/596.17 |
| 8,061,910 | B2 ‡ | 11/2011 | Kim | G03B 9/28 396/481 |
| 8,198,974 | B2 ‡ | 6/2012 | Dausch | F16K 99/0001 335/78 |
| 8,576,469 | B2 ‡ | 11/2013 | Kim | G02B 5/005 359/23 |
| 8,736,938 | B1 ‡ | 5/2014 | Schlam | E08B 3/00 359/230 |
| 8,764,320 | B2 * | 7/2014 | Hong | G03B 9/02 396/505 |
| 9,038,666 | B2 ‡ | 5/2015 | Chen | F23N 1/005 137/82 |
| 2004/0179946 | A1 ‡ | 9/2004 | Gianchandani | F04B 19/006 417/207 |
| 2006/0016481 | A1 ‡ | 1/2006 | Douglas | F15C 5/00 137/487.5 |
| 2006/0051884 | A1 ‡ | 3/2006 | McNamara | G01N 25/18 438/14 |
| 2011/0287393 | A1 ‡ | 11/2011 | Rebolledo-Mendez | G06F 3/011 434/11 |

OTHER PUBLICATIONS

Wang, et al.; Automatic bio-sampling chips integrated with micropumps and micro-valves for disease detection; Article; Biosensors and Bioelectronics: 2005; pp. 419-425; 21; www.sciencedirect.com; www.elsevier.com; © 2004 Elsevier B.V.‡

Chakraborty, et al.; MEMS micro-vale for space applications; Article; Sensors and Actuators A: Physical; 2000; pp. 188-193; 83; www.sciencedirect.com.‡

Minghuang, et al.; Nanomechanical Architecture of Strained Bilayer Thin Films: From Design Principles to Experimental Fabrication; Article; Advanced Materials; 2005; pp. 2860-2864; 17; © 2005 Wiley-VCH Verlag GmbH & Co. KGaA, Weinheim; DOI: 10.1002/adma.200501353.‡

Alben, et al.; Edge Effects Determine the Direction of Bilayer Bending; Article; ACS Publications; Nano Letters; 2011; pp. 2280-2285; 11; pubs.acs.org; © 2011 American Chemical Society; dx.doi.org/10.1021/nl200473p.‡

Zohni, et al.; Investigating thin film stresses in stacked silicon dioxide/silicon nitride structures and quantifying their effects on frequency response; Journal; Journal of Micromechanics and Microengineering; 2007; pp. 1042-1051; 17; doil:10.1088/0960-1317/17/5/026; © 2009 IOP Publishing Ltd; Printed in the UK.‡

Ashurst, et al.; Wafer level anti-stiction coatings for MEMS; Article; Sensors and Actuators A: Physical; 2003; pp. 213-221; 104; www.sciencedirect.com; www.elsevier.com; doi:10/1016/S0924-4247(03)00023-2. Published by Elsevier Science B.V.‡

Alben, et al.; Edge Effects Determine the Direction of Bilayer Bending; Article; ACS Publications; Nano Letters; 2011; pages 2280-2285; 11; pubs.acs.org; © 2011 American Chemical Society; dx.doi.org/10.1021/nl200473p.

\* cited by examiner
‡ imported from a related application

BILAYER MICROVALVE ARRAYS FOR PNEUMATIC AND FLUIDIC APPLICATIONS

CROSS REFERENCE TO RELATED U.S. APPLICATION

This application is a divisional patent application claiming the benefit of priority to U.S. Nonprovisional patent application Ser. No. 15/388,332, filed on Dec. 22, 2016, claiming the benefit of priority to U.S. Provisional Application No. 62/387,258, which was filed on Dec. 23, 2015, the contents of which are incorporated herein by reference.

STATEMENT OF GOVERNMENT RIGHTS

None.

FIELD OF INVENTION

Current embodiments described herein relate to the fabrication and uses of pneumatic and fluidic microvalve arrays that are controlled by actuators to intermittently allow or restrict gas and fluid flows through a channel.

BACKGROUND

There are various reasons and applications for configuring an opened and closable set of channels through which gas or fluids flow. The ability to allow gas and other fluid flow through such a set of channels can be used for mechanical purposes such as locomotive forces, or for maintaining gas/fluid flows such as for lab-on-a-chip applications, or for informational purposes such as conveying a representation of information or data. Increasingly, there is a desire to implement such systems in a closely spaced array to obtain a higher density of gas channels within a smaller space or volume. High density arrays can provide more precise data and information storage and representation, as well as greater capacity for mechanical or other uses. While not meant as limiting, it has been observed that an array of valves to control openings, having a diameter or width of about 2 mm, would be within the definition of a microvalve array. Because the previous statement is not meant as limiting as to dimension or scale of embodiments herein, the words microvalve and valve generally are used interchangeably throughout these teachings.

In the context of pneumatic valve arrays and similar systems that employ the movement gas or air flowing under pressure, the gas channels whose open/closed states are controlled by microvalves are generally placed into communication with an air reservoir and a pump or a vacuum. In certain settings, it is desirable to have gas flow channels that can be controlled so they will either allow or not allow the passage of discrete bursts of air or gas. This would also be true for fluid flows such as liquids. While the current description is expressed primarily in terms of pneumatic flow control, the principles and teachings would apply to liquid as well as pneumatic flows.

Bilayer films having a compressive layer and a tensile layer that causes the film to coil and retract to open a pathway for light or matter have been used as actuators for various kinds of systems. However, the ability to selectively actuate a particular valve, or to do so partially, helps realize some additional benefits with these systems, for example by offering a more dynamic and precise pneumatic system. Consider a microvalve array that is meant to represent visual information for the blind. However, instead of visual stimuli the information is represented by tactile cues consisting of periodic air bursts and gas flows that can be sensed by a user's finger, and whose intensity, duration, and frequency act in the same way that gray scale images serve the sighted portion of the population. In that setting, one can appreciate the desire to maximize the density of gas flow channels to provide enhanced resolution of the represented image. And with the need to make devices ever smaller, the larger in number a microvalve array can be, the greater the possibilities allowing for a variety of images and image details to be created. As well, such approaches to representing information for the visually impaired can go far in overcoming the inherent educational challenge when it comes to students' ability to learn visual subject matter such as geometry and calculus.

With some bilayer film systems, electrodes are used such that the coiling or unrolling of the bilayer film (i.e., whether a valve is open in the coiled state, or closed in the unrolled state) is controlled by applying voltage to the system. When voltage is controlled at each valve separately, it enables the valves to be individually controlled. Even so, various problems are sometimes encountered with these systems. For example, one potential problem may occur as the bilayer releases and unrolls over many cycles, such that the outer edges existing further from the actuator's coiled center might curl upward along the unconstrained edges and corners of the bilayer. A number of negative results follows from that type of curling, including lack of complete valve closure. Accordingly, better supported, more reliable, more consistent, and more efficient actuators are needed for a variety of applications, including pneumatic manifolds for industry, for use with fluidic arrays in lab-on-a-chip applications, and for tactile tablets for the visually impaired, to name only a few.

SUMMARY

A strained bilayer film with reinforcing members, which in some embodiments are spaced parallel to one another, is used to open and close a pneumatic valve as part of a microvalve array. A first, bottom layer of the bilayer film (i.e., proximal to the substrate) is compressive and a second, top layer is tensile relative to the first layer, thus creating the strain mismatch. The use of parallel compressive reinforcing members serves the dual benefits of reducing potential defects such as tearing at the boundary of the anchor region and sacrificial layer due to poor step coverage, and controlling the stress along the edges of the strained bilayer moving further from the anchor region. This helps the bilayer undergo repeated cycles of coiling (i.e., releasing from the substrate) and unrolling in the proper direction and shape, without unwanted curling.

The strained bilayer takes up a minimum of space when the valve is open, permitting a high density of microvalves to be utilized. This allows a large number of valves to be easily incorporated into an array. The strained bilayer film may be used for a microvalve, which will then be implemented in a gas flow supply manifold or other devices such as a reconfigurable tactile tablet for visually impaired individuals, the latter providing actuation suitable for the tactile equivalent of grayscale. Present embodiments include actuators having two or more layers of film, i.e., a multilayer film, exhibiting a net strain mismatch sufficient to cause the arrangement to coil about a radial point which is common to all the layers of film.

In some embodiments, the size of actuators that control the open/closed state of the valves is minimized by the coiling of the strained bilayer due to releasing from the substrate, to increase the density of the valves that can be placed into an array. Optionally, every gas flow channel has one inlet and one outlet, such that gas flow can be varied by actuating each valve along a spectrum from completely open to completely closed, and in between (partially closed), and by changing the state as desired repeatedly according to a computer readable program that the device executes via one or more controllers.

According to various options and alternatives existing for the present embodiments, digital control of each valve is maintained with a digital to analog converter. As desired, the size of the valves (i.e., the area of each outlet) follows a linear conversion in which a second valve is half the size of the first and a third valve is half the size of the second, etc., which is similar in principle and design to an electrical digital to analog converter. Further, additional advantages and embodiments are described and indicated below.

BRIEF DESCRIPTION OF THE DRAWINGS

The drawings, schematics, figures, and descriptions contained in this application are to be understood as illustrative of steps, structures, features and aspects of the present embodiments. Accordingly, the scope of embodiments is not limited to features, dimensions, scales, and arrangements shown in the figures.

MULTIPLE EMBODIMENTS AND ALTERNATIVES

Present embodiments include those wherein at least one gas flow valve is configured to receive a flow of gas through its inlet and to selectively discharge such flow through its outlet. A plurality of these gas flow valves configured in an assembly is referred to as an array. The gas flow valves are situated within a base that provides access to a source of flowing gas such as an air reservoir. Thereby, the air reservoir (or, synonymously, gas reservoir) communicates with each of the gas channels via their inlets. In some embodiments, a pump is connected to the gas reservoir to establish a flow of gas into the gas flow channels.

Each of the gas flow channels has one or more valves proximal to the outlet which places the gas flow channel into a particular state. In one sense, the natural state of each gas flow channel will be open, allowing gas to flow through the outlet and out of the gas flow channel. Alternatively, the state of a particular gas flow channel is closed, meaning that no gas will flow out of the gas flow channel through the outlet. Additionally, states can vary along the spectrum of partially closed. This enables the gas flow valve for a given gas flow channel to be partially closed/partially open. Voltage is used to control the state of the gas flow valve. When voltage is not applied, the valve remains in its open state. According to these embodiments, the valve in an open state will be considered the natural state. Conversely, applying voltage causes the valve to close or at least partially close, depending on how much voltage is applied. In this sense, full closure would restrict the flow, while partial closure would limit the pressure and amplitude of the flowing gas or liquid.

By having the gas flow channels incorporated within a base, it protects the channels from any incidental contact that might otherwise damage these passages to which gas flows. A further advantage of current embodiments is that it enables a high density of gas flow channels within a small-area array. This is accomplished by having the opening and closing of the valves controlled by an actuator that responds to commands from a processor or microprocessor executing computer-readable program instructions or suitable program logic. Accordingly, the state of each actuator varies between a coiled (natural state) configuration and an unrolled configuration.

By placing the gas channels in a base, it allows one to fabricate a series of openings through the base, between its top surface and bottom surface. These openings provide for outlets and inlets, respectively, for the various gas flow channels of the device. As desired, though not required, gas or fluid flow extensions are integrated with the openings to extend the gas flow channels beyond the base. A possible use for the gas flow extensions is to connect with tubing as part of a gas flow delivery manifold, or other assemblies that permit various pneumatic components—including a pneumatic or gas flow reservoir—to be connected. In such cases, the actuators for the valves described herein would be positioned proximal to the openings at the surface of the base. Accordingly, for a given channel, the gas will either flow into the gas flow extension, or would not, depending on the state of the valve. As desired, a protective covering formed from durable glass, transparent plastic, or other suitable materials is placed over the base or around extension apertures that serve as outlets for the gas flow extensions.

Besides the respective gas flow channels and outlets, each valve is controlled by an actuator that, like the valve itself, is capable of existing in different states or configurations. Each actuator is comprised of a strained bilayer film. Each actuator is designed so that its natural state is coiled such that the valve to which it is assigned will be open. In turn, each actuator is designed so that applying voltage changes the actuator from its natural state by causing it to unroll at least to a degree that a portion of the actuator covers at least a portion of the gas flow channel outlet. When the actuator unrolls completely, this is associated with full closure of the valve. Alternatively, when the actuator unrolls partially, this is associated with partial closure of the valve. For example, in some embodiments the base is formed from a substrate made from silicon (preferred) or other suitable electrical conductors. A circuit formed between two electrodes causes the actuator to unroll when voltage is applied because the actuator is attracted to the substrate. As the actuator unrolls, it either completely or partially closes the valve for the gas flow channel. In some embodiments, stable actuation of the strained bilayer film is accomplished at an applied voltage maintained between about 60 and 70 V.

Having a strained bilayer film as an actuator being controlled by the application, or the absence of voltage, enables the actuator to be tightly coiled in its natural state, when the valve is open. This reduces the amount of volume that must be occupied by an actuator that is proximal to the outlet of the gas flow channel. By reducing this volume, it allows a more dense array of gas flow channels and valves to be used in the device.

Each actuator forms a strained bilayer film because it is comprised of a first material that is compressive in relation to a second material, whereas the second material is tensile in relation to the more compressive first material. This can be achieved in various ways. For example, when fabricating the actuator, a first layer positioned more proximal to the substrate has a compressive stress, while a second layer positioned in contact with the first layer has a tensile strain. Alternatively, the first layer has no strain and the second layer has a tensile strain. Or, the first layer has a compressive stress while the second layer has no strain, and the embodiments also include arrangements having a highly compressive first layer, and second layer that is compressive, but less compressive than the first. What is important is that the non-uniform strain mismatch between the layers causes the actuator to naturally remain in a coiled state or configuration, while the application and maintenance of voltage to the actuator causes it to unroll.

The internal strain between the layers of the actuator will vary based on the thickness of this part. As the actuator unrolls, the more compressive first layer resists the process as it unrolls. As the non-uniform strained would otherwise induce the actuator to naturally coil. It is the electrostatic force that occurs as voltage is applied and maintained that exerts a force on the actuator, causing it to unroll. Another advantage of the configuration of these actuators is that during actuation, very little current flows, thus the power consumption is negligible. As discussed herein, by varying the voltage applied and maintained, one can unroll the actuator to different lengths, which permits the gas flow to be varied selectively in relation to the voltage.

In some embodiments, two materials are chosen for bilayer 11 that are commonly deposited together using thin-film deposition techniques. Appropriate choices for the bilayer materials include silicon dioxide, polyimide, polysilicon, amorphous silicon, titanium, titanium tungsten. While not limiting, in some embodiments, Young's modulus for the first layer is between about 100 gigapascals (GPa) and 150 GPa (e.g., 125 GPa), and for the second layer is between about 40 GPa and 85 GPa (e.g., 65 GPa). By using the value of Young's modulus for the respective layers, a radius of curvature is proportional to the expression:

$$\frac{d[3(1+m)^2 + (1+m)(m^2 + mn^{-1})]}{6\varepsilon(1+m)^2}$$

where d denotes the combined thickness of the bilayer, e is the fractional difference in the unconstrained relaxed length of the two layers that form the bilayer, n is the ratio of the layer films' elastic modulus, and m denotes the ratio of the thickness of the first bilayer film layer over the second layer.

Materials which are suitable for actuating a microvalve array according to present embodiments can be selected based upon processing considerations, mechanical considerations, and electrical considerations. One or both materials used in the bilayer must be electrically conductive. In some embodiments, the second (tensile) layer is an electrical conductor and is in contact with an additional electrode 14. As desired, the additional electrode is deposited as a thin film and patterned during fabrication through well-known techniques. Further, in some embodiments, the first (compressive) layer is electrically conductive to optimize the electrostatic force for a given voltage, thereby minimizing the actuation voltage.

Additionally, the bilayer materials should exhibit appropriate intrinsic stress values and be able to be repeatedly actuated without failure. Further, the material for the reinforcing members used in some embodiments can be selected based on like considerations, and in some cases will be the same material as used for the first layer proximal to the substrate.

As FIG. 1A-F illustrate, a pneumatic microvalve array device 5 that offers the benefits of present embodiments can be fabricated on a substrate 10 comprising a silicon wafer that represents a first electrode, together with an insulator layer 12 that could be a layer of oxide (e.g., silicon dioxide) that is thermally grown according to conventional techniques. Though not meant as limiting, a four inch type (100) silicon wafer with a 500 nm layer of oxide is suitable for the initial layers shown in FIG. 1A. As seen in FIGS. 1A-1D, optionally the back side of substrate 10 will have an added layer 19 of the oxide (e.g., SiO2) that protects the substrate during fabrication.

Figure 1A:
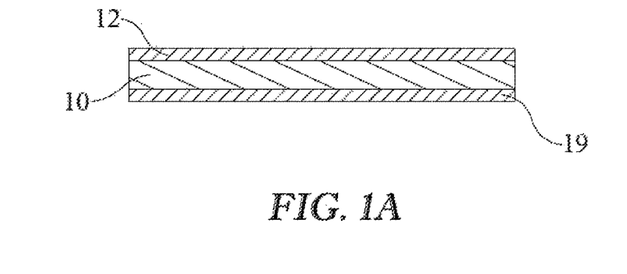
FIGS. 1A-F taken together offers a cross-sectional view of a strained bilayer film microvalve device during various stages of fabrication, according to multiple embodiments and alternatives.
Figure 1B:
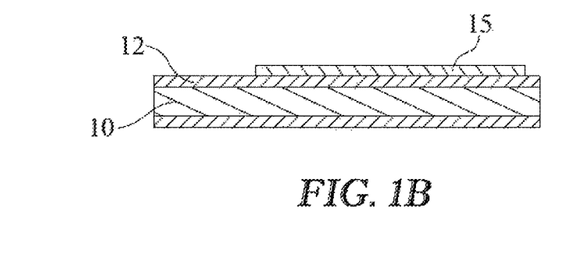

Turning to FIG. 1B, a sacrificial layer 15 is then deposited over layer 12. In some embodiments, layer 15 is a 100 nm layer of amorphous silicon deposited by Plasma Enhanced Chemical Vapor Deposition (PECVD) at 350 degrees Celsius and 500 mTorr. After deposition, the amorphous silicon layer 15 can be patterned and etched using Reactive Ion Etching (RIE) with SF6 gas (sulfur hexafluoride) at a pressure of 5 mTorr.

Figure 1C:
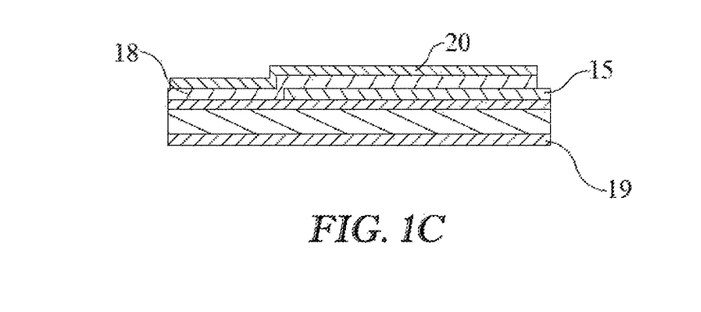
Figure 1D:
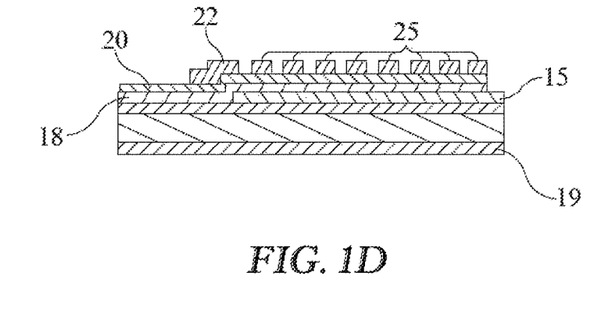
Figure 1E:
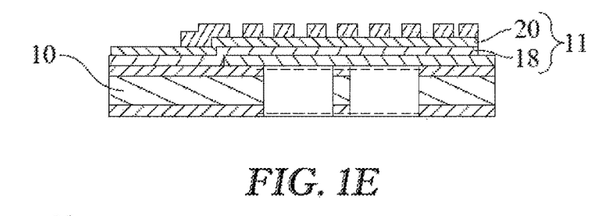

In some embodiments, as seen with the strained bilayer in FIGS. 1C and 1E, a first layer 18 of a bilayer 11 is deposited as a compressive film. Silicon carbide (SiC) is also among the suitable choices for this layer, and a 100 nm film is an appropriate thickness in some embodiments. Next, a second layer 20 of film is added, for example by sputtering, atop the first so that at least a portion of bilayer 11 (i.e., first layer 18 and second layer 20) is separated from substrate 10 by sacrificial layer 15. Aluminum and chromium are also among the suitable choices for this layer, and a 100 nm film is an appropriate thickness for some embodiments. As desired, bilayer 11 is patterned by wet etching the aluminum and the SiC is dry etched using SF6 gas, revealing the pattern shown in FIG. 1C.

In some embodiments, material for reinforcing members is then added atop the second layer. This can be, for example, a 200 nm film of SiC to be deposited and patterned for reinforcing members 25 as shown in FIG. 1D. To offset intrinsic weaknesses at the anchor point, in some embodiments this additional layer of SiC is patterned into a shoulder 22 existing at the interface, between sacrificial layer 15 and an anchor region where bilayer 11 will release and begin to unroll.

Figure 1F:
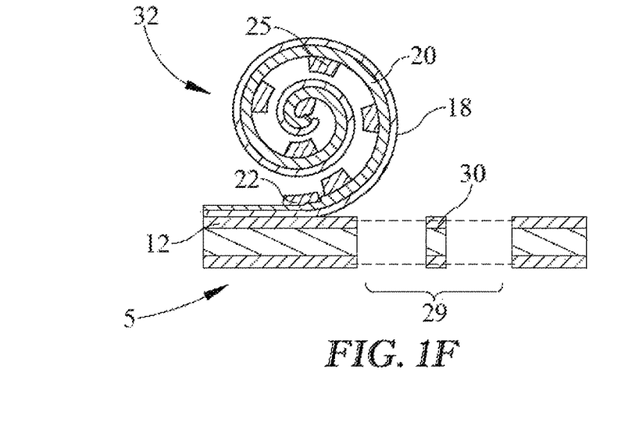
Figure 2:
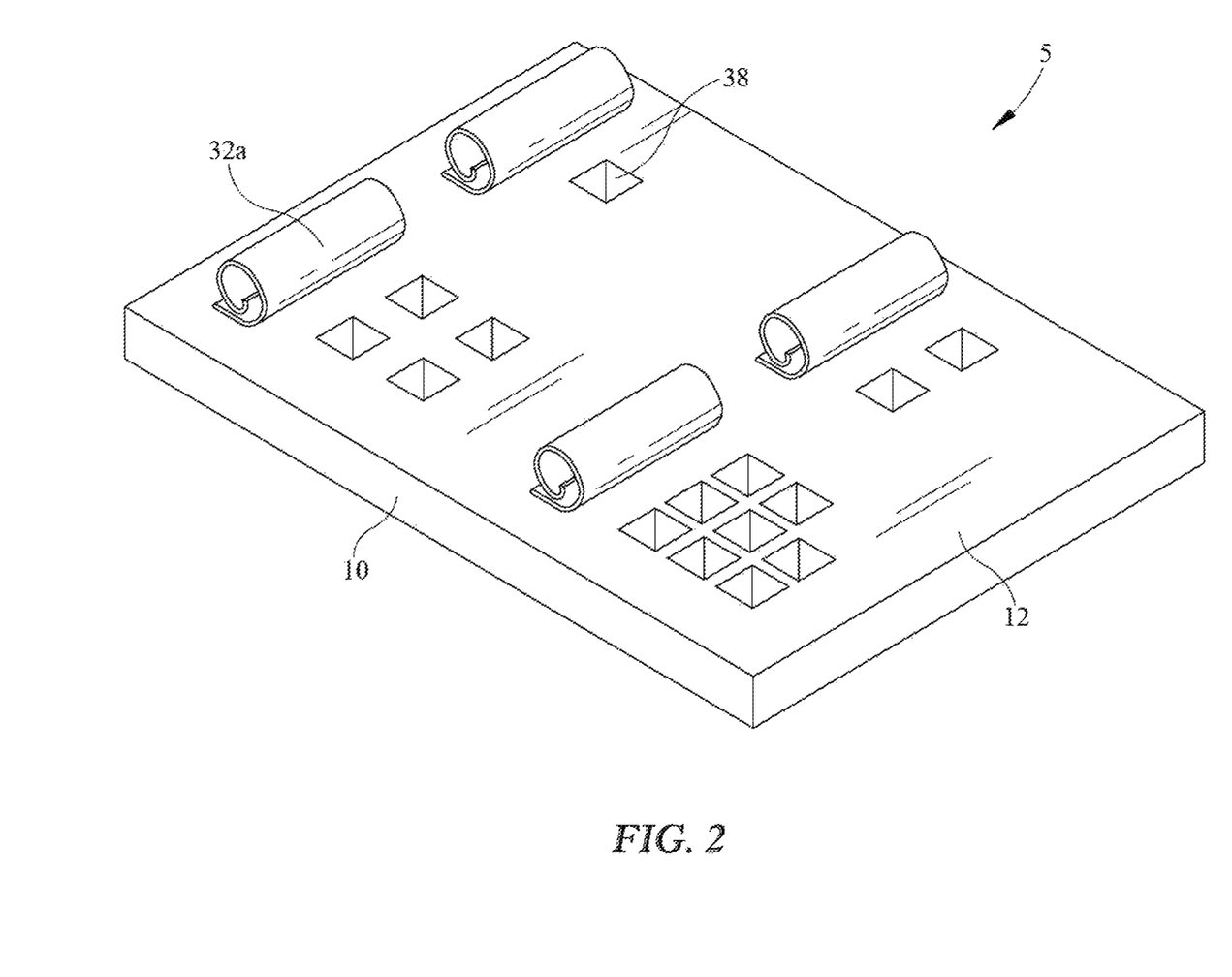
FIG. 2 is a perspective view of a microvalve array device consisting of multiple actuators, according to multiple embodiments and alternatives.

At this stage, in an exemplary, non-limiting fabrication sequence, substrate 10 is flipped over and a hole is etched through the back side layer 19 using RIE. In turn, a hole 29 for the gas channel itself (the outlet 38 of which is seen in FIG. 2) is then etched through substrate 10 by DRIE (Deep Reactive Ion Etching), wherein SF6 and oxygen with a radiofrequency power of 20 Watts and an etch to passivation ratio of about 13 to 8 has been found suitable. After the DRIE step, the SiO2 on the back side of the substrate is etched away revealing the pattern shown in FIG. 1E, wherein the inlet for the gas channel is formed into the back side of the substrate. At the next step, FIG. 1F shows actuator 32 having been released by etching to remove the sacrificial layer, which frees the actuator to unroll in its free region not anchored to substrate 10. A suitable etchant for the sacrificial layer is XeF2 because it is a dry etch that reduces stiction (discussed elsewhere herein) and does not attack the bilayer materials 18, 20.

In some embodiments, and as reflected in FIG. 1F, hole 29 is etched in such a way as to leave a portion of substrate intact, occupying a space within the opening formed by hole 29. As discussed further herein, optionally leaving a portion of the substrate intact constitutes a support 30 that is in electrical communication with the electrodes to add electrostatic stability to the actuator in the unrolled state. Thus, the illustration of device 5 in FIG. 1F shows substrate 10 as the first electrode and an additional electrode 14 (optional) contacting the second (tensile) layer 20 which is in contact with the first (compressive) layer 18, with either layer 18 or layer 20 or both serving as the second electrode. Additionally, shoulder 22 and reinforcing members 25 add mechanical stability to actuator 32 to mitigate against problems as it cycles between the coiled and unrolled states. Accordingly, in some embodiments, shoulder 22 is positioned at or near an interface between the anchor region and the free region. While this exemplary fabrication process is detailed herein, other fabrication methods are known in the art and can be used in forming the device 5.

FIG. 2 provides an illustration of a finished device 5 containing multiple microvalves with actuators 32a in the coiled configuration. In later figures such as FIG. 3A, actuators in the unrolled condition are designated 32b. FIG. 2 shows substrate 10 for the device, i.e., first electrode, an insulator layer 12, wherein the bilayer forming each of the actuators 32 provides a second electrode for each valve, and an outlet 38 for each gas channel formed by the fabrication of holes 29 as discussed in FIG. 1F. In some embodiments, insulator 12 is unnecessary wherein the first layer is formed from an insulating material and the second layer of the bilayer is electrically conductive and provides the second electrode.

Returning briefly to the discussion of materials, for an exemplary fabrication, Table 1 below lists deposition conditions for SiC (PECVD) and aluminum (sputter) in relation to measured intrinsic stresses, with a compressive stress being indicated by a negative sign (the stress measurements were made using a TOHO FLX-2320-S Thin Film Stress Measurement System). Again, alternative materials can be selected according to the particular needs of the device and microvalve array system.

TABLE 1

| Material | Temp. (° C.) | Pressure (mTorr) | Gases | Gas Flow Rate (SCCM) | DC Power (W) | RF Power (W) | Measured Stress (MPa) |
|---|---|---|---|---|---|---|---|
| SiC | 350 | 500 | 5% $SiH_4$/Ar $CH_4$ | 300 100 | NA | 20 | −284 |
| Al | 21 | 5 | Ar | NA | 500 | NA | 20 |

In some embodiments, the strained bilayer film is marked by a mismatch wherein the resistance provided by the tensile layer (as a function of Young's modulus) is reduced, thereby to increase the differential between the layers, which serves to reduce the radius of curvature and conserve space taken up by the actuator within the device. Moreover, the compressive stress associated with the first layer—and thereby the strain mismatch between respective layers—can be increased by modifying the deposition conditions as known in the art.

Although the scope of the present embodiments is not limited to particular sizes, scales, and number of gas flow channels in an array, one objective is to be able to increase the density of the array by reducing the size of the actuators that determine the state of the valves that control the gas flow channels. In this sense, circuits are formed between electrical contact pads assigned for each actuator and an anchor point where the actuator remains fixedly attached to the substrate. Appreciating that some valves are closer to the periphery than others, the traces or wires that complete the connections between the pads and the actuators will either be shorter or longer based on the location of the valves. When the distance is shorter, the traces can be formed more narrowly to minimize electrical resistance. Conversely, for actuators that are further from the periphery, i.e., further from the center of the array, it necessarily means the length of the traces is greater, so these traces are formed wider in some embodiments. This enables one to accommodate a plurality of traces running in parallel among the various actuators for the valves.

In some embodiments, the traces serving actuators further from the periphery may be on the order of five times wider than those connected to the near-periphery actuators. Generally, the greater the length of the trace from contact pad to actuator, the greater the need to reduce electrical resistance. In some embodiments, shorter traces serving near-periphery actuators are about 20 μm wide while the longer ones serving actuators closer to the center are on the order of about 100 μm in width.

In some embodiments, a designer will want to place the electrical contact pads around the periphery of the device, and set up an array of gas flow channels whose distance from the periphery varies. Herein, a 15×15 array of gas flow channels is discussed for illustrative purposes, but arrays many times the orders of this illustration are contemplated as well. The description of the array is a way to refer to the density of gas flow channels in a device. Thus, a 15×15 array of valves provides 225 gas flow channels, with the ability to selectively actuate each valve individually. This provides a near infinite number of gas flow patterns to be achieved. To illustrate, a 15×15 array of valves, each having its own actuator according to the descriptions herein, can be formed successfully and practically on a 100 mm diameter round substrate comprising a silicon wafer. Each of the 225 strained bilayer films is separately actuable by voltage applied from a plurality of electrical contacts. In some embodiments, these contacts are placed around the periphery of the device, such as with the round wafer as mentioned above.

As skilled artisans will appreciate, based on the present embodiments, arrays wherein the number of gas flow channels are orders of magnitude higher are available, and the flow of gas according to a near infinite number of patterns achievable by providing individual voltage control to the actuators. Moreover, in some embodiments, a heater is connected to the gas flow as it enters the inlet of one or more gas flow channels for varying the temperature of the gas flow, wherein the increase or the decrease of temperature is also used to vary the gas flow pattern through the channels.

It will be evident that the charge created by the circuit that induces the bilayer to unroll is concentrated on the two electrodes where the electrodes are in close proximity to each other, such as the anchor region and the unrolled portion of actuator. As the bilayer unrolls over the gas flow channel, there is no electrode on the substrate to generate a force for further unrolling the bilayer, with the only force being generated at the periphery of the gas flow channel. Thus, in some embodiments, additional benefits are realized by adding supports within the openings serving as outlets for the gas flow channels. In some embodiments, the supports are formed as the substrate is etched, and when in contact with the first layer comprising the electrode, they also receive the charge flowing from the circuit between the electrodes. By doing so, it disperses the charge necessary for electrostatic forces that induce actuators to unroll. By making the charge more diffuse, it enhances the process as the actuators unroll, and helps avoid problems such as curling.

Indeed, this additional electrostatic support assists in understanding one of the unique problems that is overcome by the present embodiments. Because of the strain mismatch and the electrostatic forces needed to overcome the natural tendency to coiling, the actuators are susceptible to curling, especially at the non-anchored edges of the actuator. Because it is these non-anchored portions that cover the gas flow channel outlets, curling would tend to reduce how much of the opening is covered by the actuator. Thus, making the electrostatic forces more diffuse and not centered at a single anchor point provides electrical stability that helps alleviate the problem of curling.

A problem that is related to curling is tearing. The strained bilayer film is thinnest at the interface between the anchor point and the non-anchored regions of the actuator due to the step up over the sacrificial layer later. Consequently, and due to the intrinsic stress created during release of the actuators from coiled to unrolled, this thin region is a potential weak point where the actuators are more susceptible to tears. A solution to this vulnerability is that in some embodiments, one or more reinforcing members is added to the aforementioned second layer, i.e., the layer distal to the substrate when the actuator is unrolled. In some embodiments, these reinforcing members comprise strips of compressive film that has a strain mismatch with this distal layer. These are oriented at 90° to the longitudinal axis of the actuator, i.e., parallel to one another in the direction the actuator unrolls.

In optional embodiments that further comprise one or more reinforcing members, the sequence of layers starting with the substrate includes a compressive layer, a tensile layer, and an additional set of compressive reinforcing members. This results in there being no net moment induced by the respective layers, which reinforces the actuators and limits or prevents curling and tearing. When reinforcing members are used, some embodiments have the respective actuators configured so that the reinforcing member overlays the interface between the anchor point with the substrate (where the step up over the sacrificial layer is seen) and the non-anchored portion of the actuator to form a shoulder. Accordingly, in some embodiments such as that shown in FIG. 7A, the first reinforcing member (i.e., shoulder) bolsters the anchor region at the interface and limits tearing, and additional reinforcing members are used to add additional support to the actuator and prevent unwanted curling along the edges.

Another potential problem encountered with actuators of this type involves stiction, which is the friction force that must be overcome to set one object in motion relative to another. When the concept is applied to these actuators, stiction is the frictional resistance in transitioning from the unrolled state to the coiled state when voltage is removed. In some embodiments, this potential problem is overcome by reducing the surface contact between the actuator and the substrate. In some embodiments, surface contact is reduced by allowing precipitates to form on the substrate during fabrication to provide nano-texturing. The roughness associated with this texturing reduces the surface contact sufficiently to overcome stiction. For example, including a tensile layer like aluminum that has a small percentage of silicon (e.g. about 1.5%) will naturally form precipitates at the grain boundaries during the annealing process, which facilitates the texturing that occurs. Moreover, the fact that the actuator unrolls over a relatively small surface area helps offset the effects of stiction because of capillary forces involving water molecules existing on the surface of the substrate. At the same time, these intrinsic stresses for releasing the actuator's free region (i.e., non-anchored) from the substrate can be further optimized by the selection of materials so that the electrostatic force is sufficient to overcome stiction during the unrolling of the actuator.

When such an array of gas flow channels is incorporated into a substrate or other base according to multiple embodiments described herein, it will be appreciated that a number of uses can be accomplished. For example, one application of the gas flow channel/actuable valve array involves manifolds with multiple valves wherein each is individually controlled for integration with a variety of other devices that utilize a variable flow of gas. According to present embodiments, devices and arrays can be manufactured wherein the gas flow channels are fabricated simultaneously with the device, and this can be accomplished in a cost-effective manner, utilizing a very small volume of space, and with negligible power consumption.

Figures 3A, 3B:
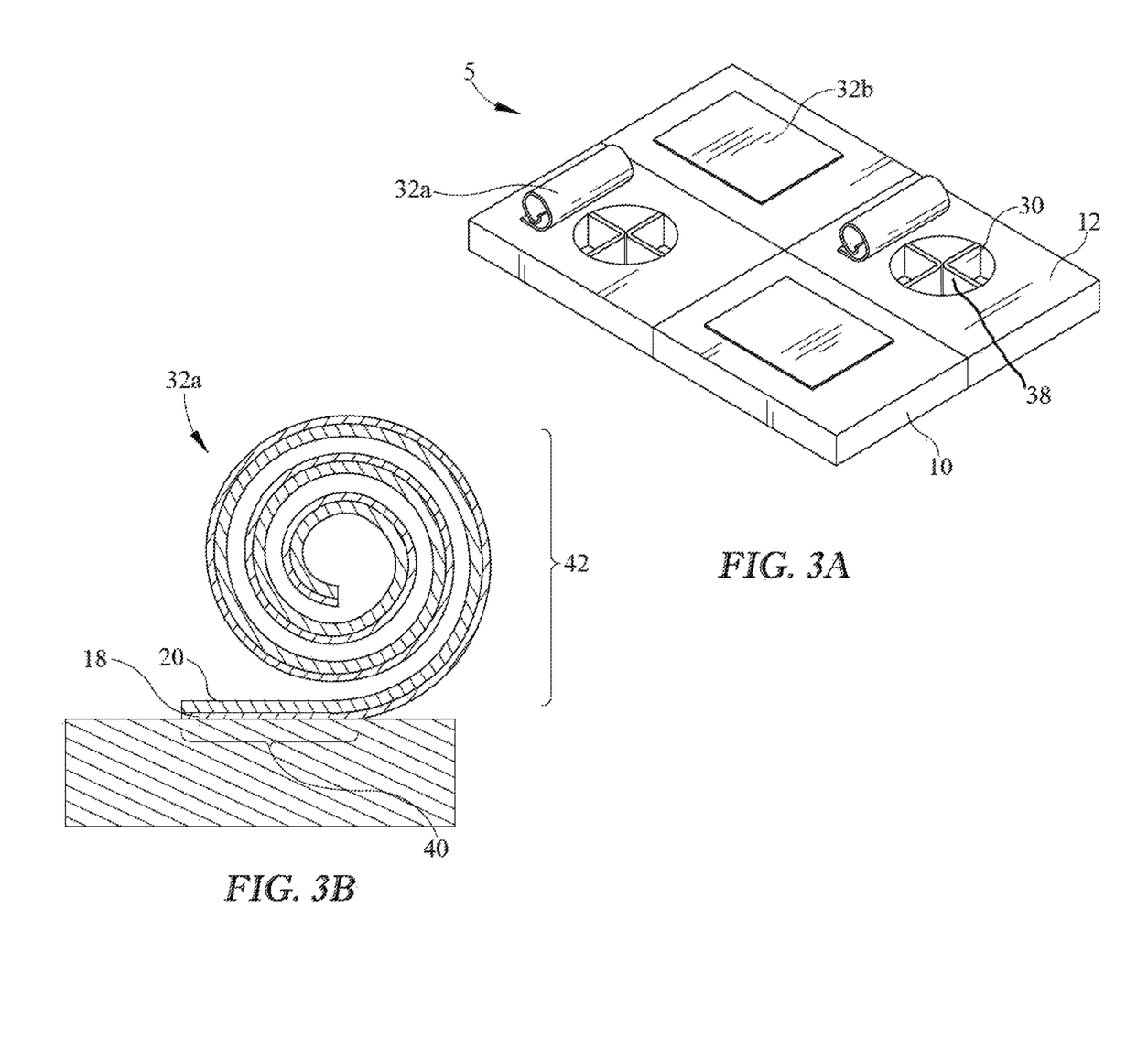
FIG. 3A is a perspective view of a microvalve array device, according to multiple embodiments and alternatives.
FIG. 3B is a cross-sectional perspective view of an actuator having an anchored region and a free region, according to multiple embodiments and alternatives.

Now returning to discussion of the figures, in FIG. 3A shows device 5 wherein two of the actuators 32 are in the coiled state (this state is designated 32a, and listed once in the figure for brevity) and two actuators 32b are in the unrolled state. An outlet 38 of the gas channel formed through the full thickness of substrate 10 and insulating layer 12 is shown, with support 30 traversing the interior space within hole 29 that includes outlet 38 (see also FIG. 2 for outlet, shown there without a support). While support 30 is shown in a cross- or X-shaped configuration, other geometric shapes are within the scope of present embodiments. FIG. 3B shows actuator 32a in cross-section, in its coiled state with an anchor region 40 proximal to where layers 18, 20 are anchored, and a free region 42 that is movable and is the part that unrolls when voltage is applied.

Figure 4:
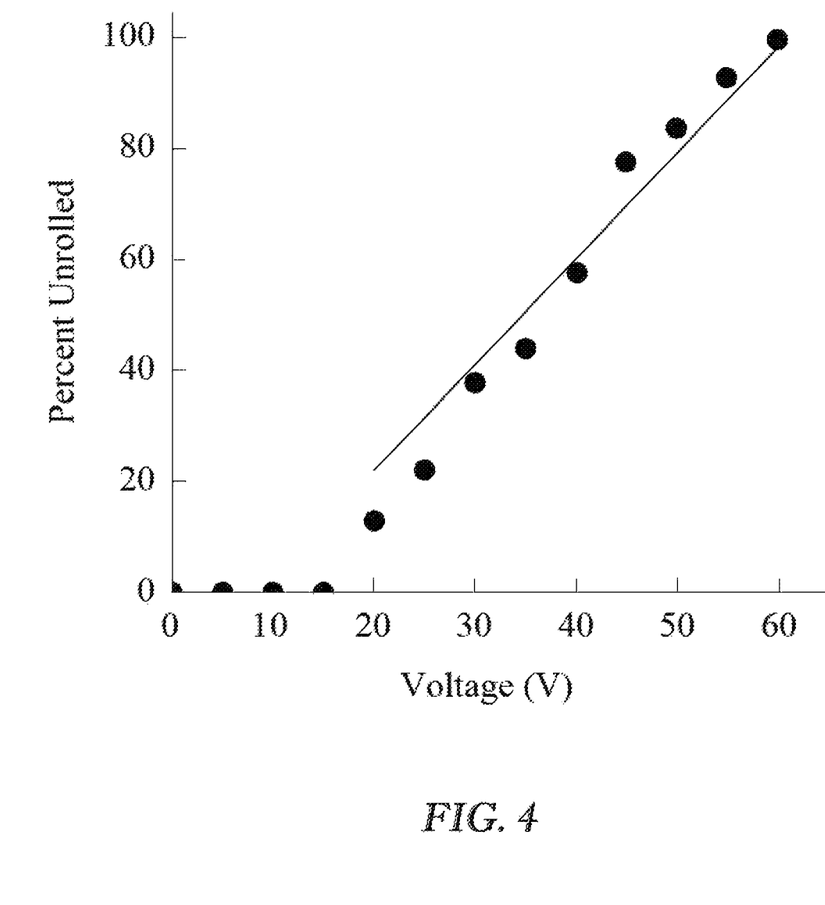
FIG. 4 is a graph that plots the relationship between voltage applied and the extent an actuator will unroll, according to multiple embodiments and alternatives.

FIG. 4 graphs the relationship between the applied voltage and the percent distance that the strained bilayer film has unrolled. In an exemplary fabricated device, above about 15 V, the bilayer film unrolls in a nearly linear fashion with respect to voltage. In this manner, and depending on the size of the array, a variable flow of gas or air (in terms of pressure, amplitude, frequency, and other variables, which might also include temperature) can be programmed for each gas channel according to a nearly infinite selection of possible patterns.

Figure 5A:
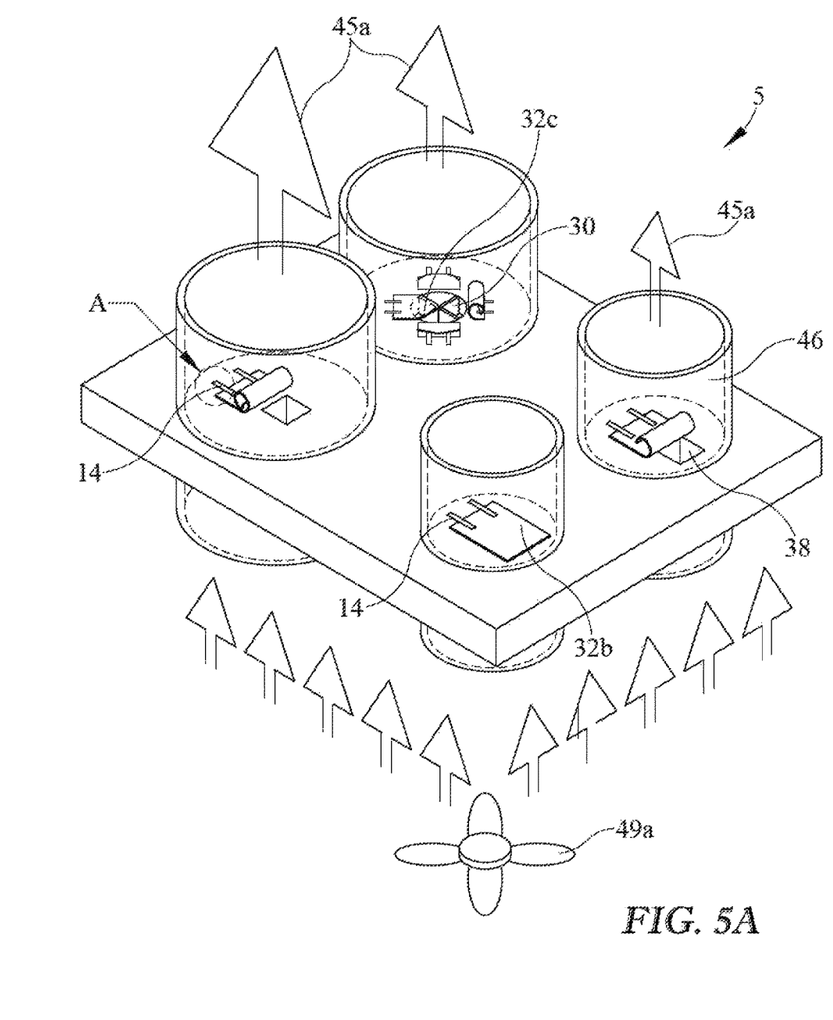
FIG. 5A is a perspective view of a microvalve array with four valves, according to multiple embodiments and alternatives.

FIG. 5A shows a microvalve array for a device 5 having four valves. The one depicted in the lower left of the figure has a region indicated as "A," and this region will be discussed in connection with FIG. 5B. With the actuator in the coiled position, the valve is open. Moving clockwise, the next valve is partially opened in that there are four smaller actuators surrounding the opening, and three of them are in their coiled state while one is unrolled. However, the unrolled actuator (denoted as actuator 32c) has an end region that is shaped to only cover one portion of the opening, which is seen as divided into quadrants by support 30.

Figure 6:
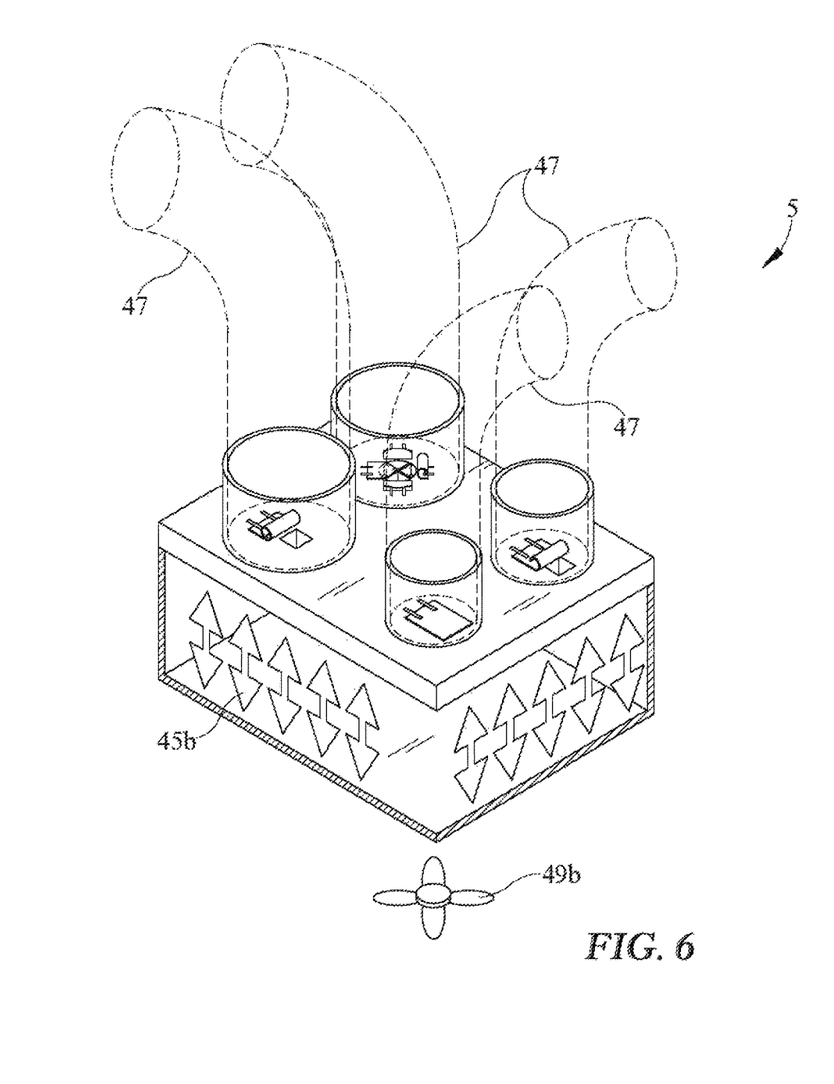
FIG. 6 is a perspective view of a microvalve array with four valves showing that it can be configured for single direction or bidirectional gas flow, according to multiple embodiments and alternatives.

Continuing clockwise for FIG. 5A, the next valve has only one actuator—not multiple ones as with the valve just discussed—but is still partially opened and partially closed. As seen, outlet 38 of the valve is partially covered by this actuator which is only partially unrolled, based on the relationship of voltage to percentage of unrolling as discussed in the FIG. 4 graph. It will be appreciated that directional arrows 45a indicate a flow of gas from three of the four gas flow channels via the respective outlets 38 (only one of which is labeled, for brevity). In some embodiments, as desired, FIG. 5A shows an extension 46 (again, only one being labeled) which can be connected to hoses 47 or tubing or other means to extend the channel (as seen in FIG. 6). In some embodiments as shown here, extensions 46 are used on either side of substrate 10. Continuing clockwise, the fourth valve 32b is shown in the unrolled state. Here again, second electrode 14 is labeled (though it could be present for all four), again for electrical connection to initiate an electrostatic force needed to unroll the actuator when voltage is applied. Also, FIG. 5A depicts a pump 49a for initiating the gas flow that enters the respective gas channels and, depending on the state of the actuator, flows out of their respective outlets 38.

Figure 5B:
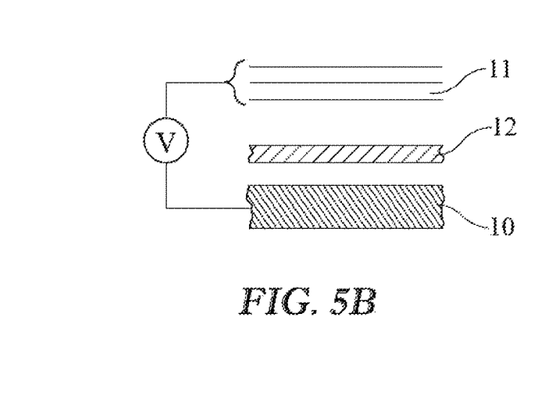
FIG. 5B offers a cross-sectional view of region A of FIG. 5A showing electrical connections for applying voltage to the bilayer of an actuator, according to multiple embodiments and alternatives.

FIG. 5B is a cross-section of region A noted for one of the actuators in FIG. 5A. In FIG. 5B, various layers are separated in order to more clearly discern the parts that establish the electrical field needed to apply the actuation voltage. Accordingly, substrate 10 (first electrode) and insulating layer 12 are shown with a slight separation in FIG. 5B, even though generally they are in contact. Likewise, at least one layer in the bilayer is electrically conductive, making bilayer 11 a second electrode and providing electrostatic force for unrolling as sufficient voltage is applied. In some embodiments, an optional additional electrode 14 is included (not shown in FIG. 5B, but included in FIG. 5A).

FIG. 6 shows many of the same features of a device 5 as FIG. 5A, but also illustrates that instead of a pump, some embodiments utilize a pump and/or a vacuum (the latter being shown as 49b in FIG. 6) wherein the vacuum pulls gas into the channels as noted by directional arrows 45b. What was previously noted as outlet 38 would then be an inlet, the passage through which is determined by the state of its actuator. In some embodiments, both a pump and vacuum are configured to alternate, providing bidirectional flow.

Figure 7A:
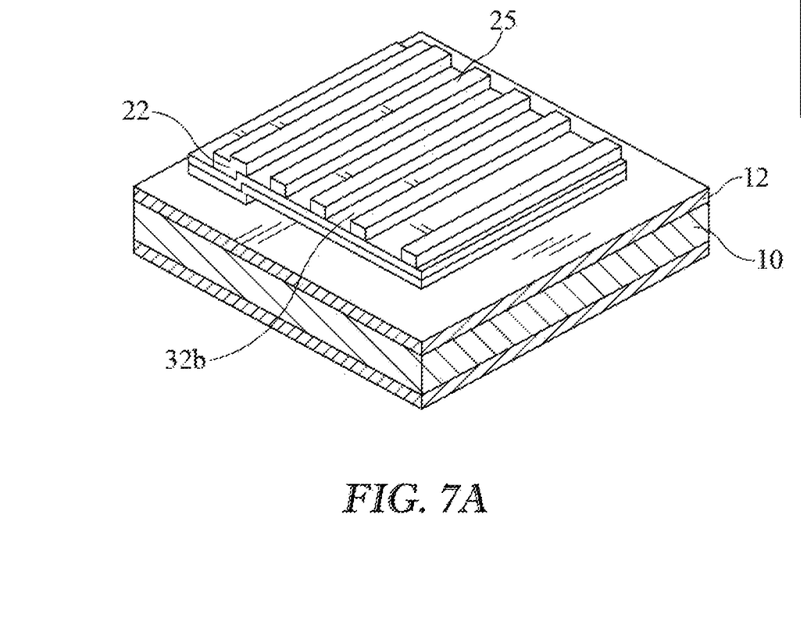
FIG. 7A offers a perspective view of a microvalve array with reinforcing members, according to multiple embodiments and alternatives.
Figure 7B:
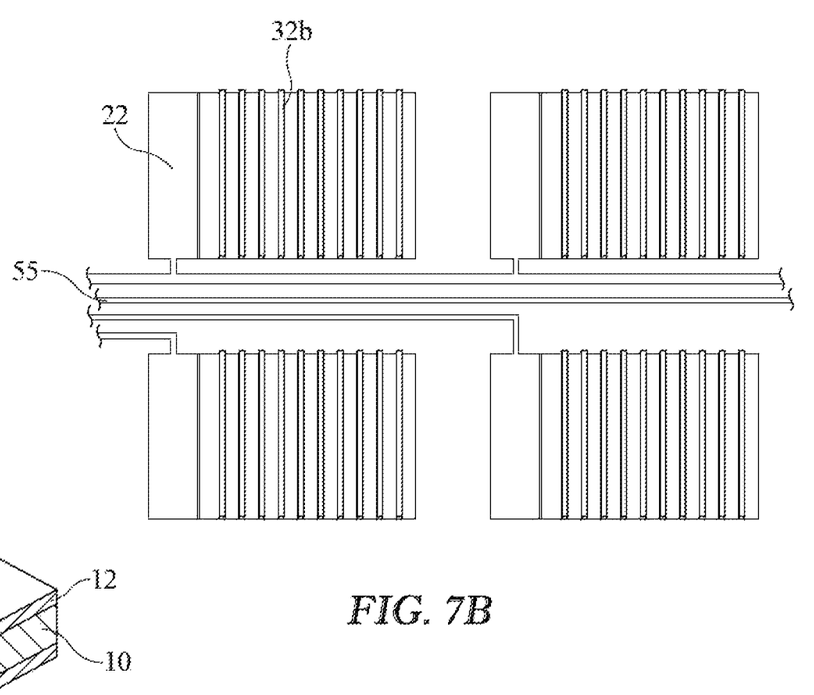
FIG. 7B offers a top side view of a microvalve array with reinforcing members, according to multiple embodiments and alternatives.

FIG. 7A is a perspective view of a device having substrate 10, with other features being understood in accordance with various other drawings, though not all specifically delineated. Also shown in FIG. 7A is actuator 32b (unrolled state) with shoulder 22 and reinforcing members 25 (one of which is labeled) for increased mechanical integrity. FIG. 7B is a top side view of a similar device with four actuators 32b in the unrolled state, with reinforcing members visible, and showing electrical conduit 55 (wires, or traces) providing electrostatic charge to unroll the actuators.

Figure 8A:
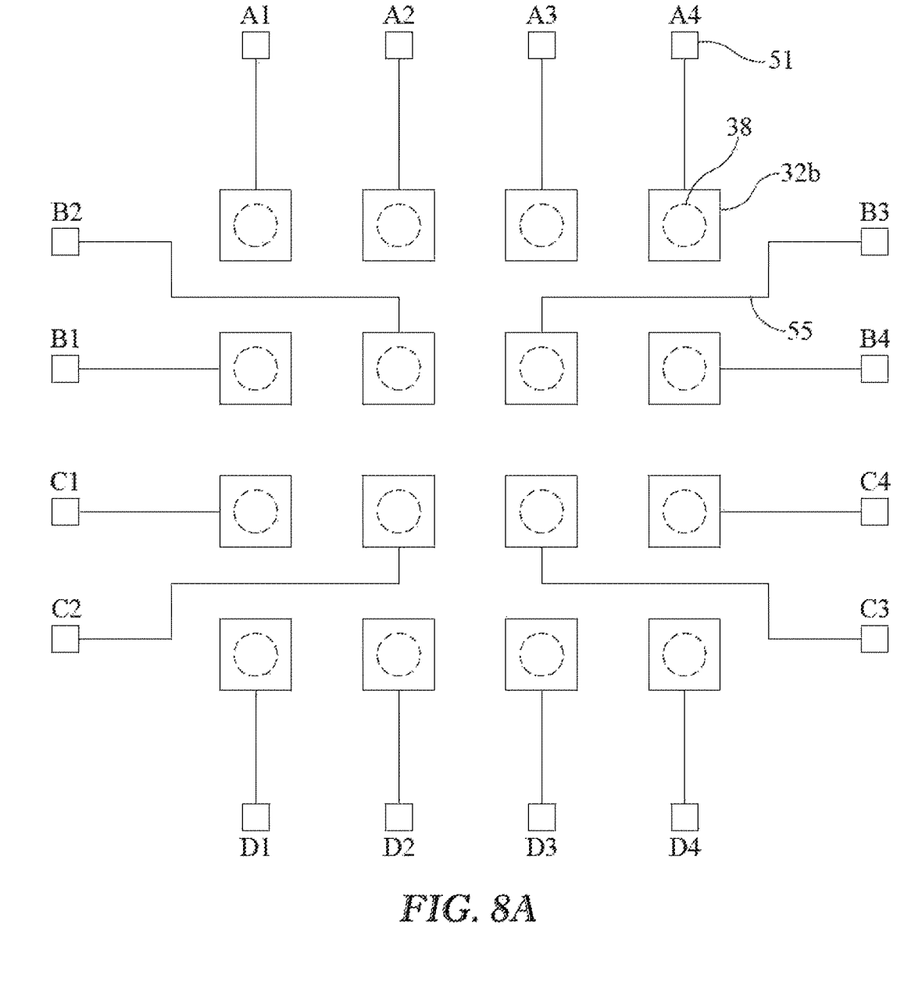
FIG. 8A provides an elevation view of a device having an array of microvalves with exemplary electrical connections, according to multiple embodiments and alternatives.

While not meant to be limiting, FIG. 8A shows an exemplary array with wiring and connections for individually controlled actuation of many valves, according to multiple embodiments. In non-limiting fashion, FIG. 8A shows a microvalve array having a number of pads 51 on its periphery. In a very large array, this arrangement makes the pads more accessible for wiring. In some embodiments, as FIG. 8A illustrates, the pads and actuators are in a 1:1 relationship and the number of pads is the same as the number of actuators, with electrical connection between each pad and actuator combination being provided by wires or traces 55 (one of which is labeled). Accordingly, each pad is individually addressable with its own electrical contact pad along the periphery of the wafer has an attached wire that is electrically connected to at least one valve for individual control of the valves. In some embodiments, a microvalve array is set up and labeled according to a letter-number combination that denotes row position (e.g., designated by letter, not shown) and column position of the array (e.g., designated by number, again not shown) to determine which actuator will be unrolled when a voltage is applied, or returned to the natural coiled state when voltage is removed. In a large array, this helps arrange the individual control which is exerted upon, for example, a valve A4 or B2 and so on. The embodiment shown in FIG. 8A reflects actuators 32b in a state wherein the bilayer is unrolled, i.e., the valve is closed, such that the outlets 38 are shown with a broken line. For brevity, only one pad, actuator, and outlet is labeled in this figure.

Figure 8B:
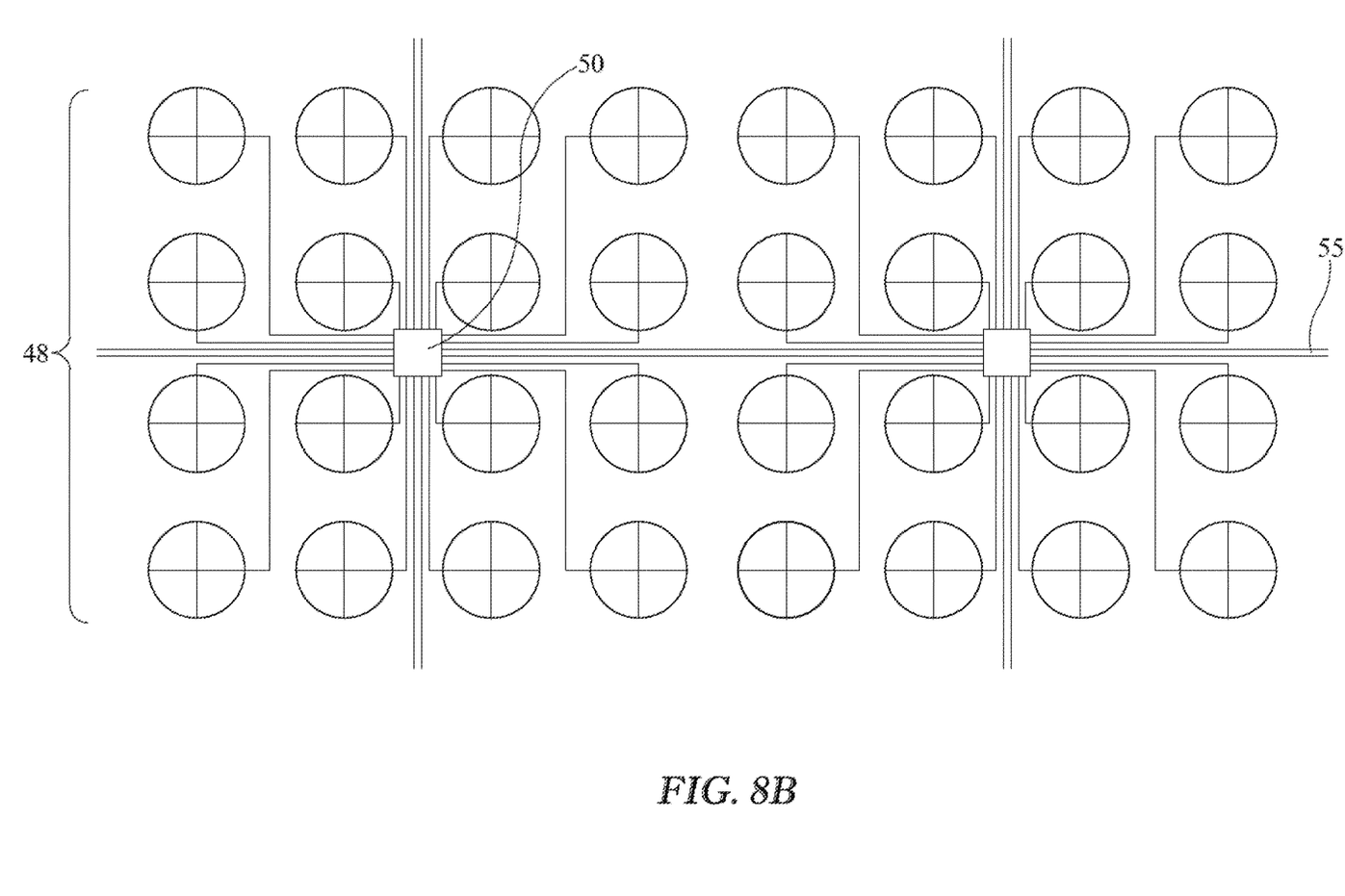
FIG. 8B is a schematic diagram representing a portion of a microvalve array with integrated circuitry, according to multiple embodiments and alternatives.

In some embodiments, connections between and among valves are serial, while FIG. 8B shows a portion of a microvalve array 48 arranged by multiple integrated circuits operating by generalized microcontrollers 50 or other digital circuitry such as shift registers. Though not meant as limiting, arrays on the order of 100×100 (i.e., $10^4$) and higher are within the scope of embodiments. For a very high density array, the integrated circuits can be bonded to the surface between the openings providing local control. As shown in FIG. 8B, each integrated circuit would control a 4×4 array, or 16 gas flow valves. Each integrated circuit communicates with a neighboring circuit via a serial bus in the horizontal direction. As desired, these arrangements can be expanded further so that each integrated circuit controls more valves, as the wiring density permits.

In some embodiments, an actuator array is provided as an improvement for tactile representation systems for the blind, such as by providing a microvalve array for actuating a configurable tactile tablet for the visually impaired. While the visually impaired might not be able to perceive a grayscale display that ranges from light to dark, such learners are able to perceive inputs in much great deal through their tactile senses. Accordingly, a grayscale concept that seeing people use can be modified by arranging sensed impulses from high to low pressure, or high to low frequency, or by altering temperature, wherein the impulses are formed by gas flowing from a channel and contacting the user's fingers in a computer-controlled, predetermined pattern and frequency. An exemplary device along such lines is disclosed in published U.S. application US2011/0287393, titled "Tactile representation of detailed visual and other sensory information by a perception interface apparatus." The contents of this published application and any patent that follows from it (Notice of Allowance was mailed; issue fee was paid) are incorporated by reference herein.

Figure 9:
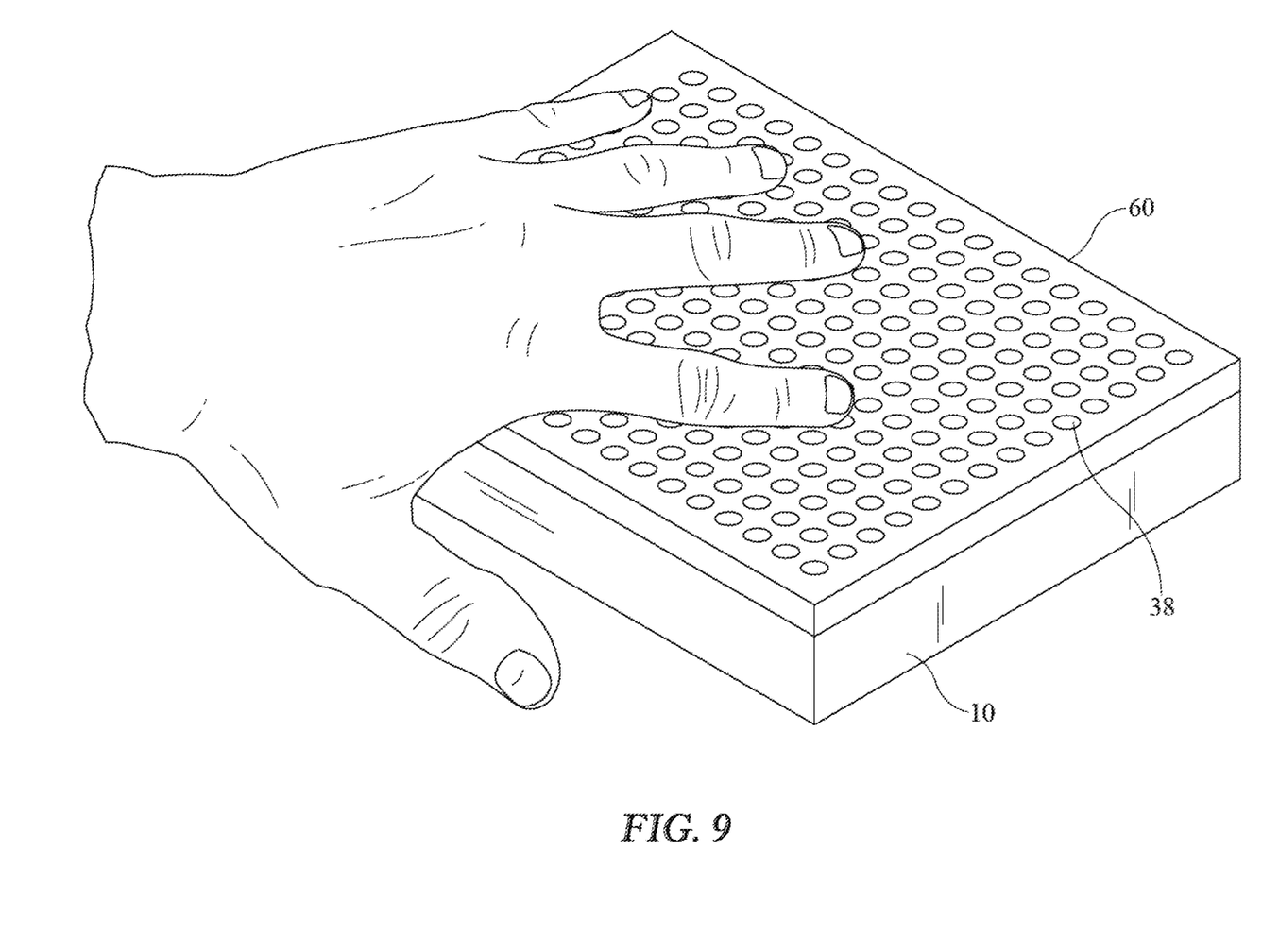
FIG. 9 is a perspective view of a specific embodiment for a microvalve array which provides tactile representations of visual information, for use by the visually impaired, according to multiple embodiments and alternatives.

Thus, present embodiments include a microvalve array and electrical connection interface combined with a tablet device 60 as shown in FIG. 9, comprising a base 10 and a plurality of outlets 38 through which a gas flows out of a like number of channels. In the context of combining the present embodiments with a tablet device such as shown in FIG. 9, such flowing gas comprises intermittent airbursts from channel to channel that are caused to vary in terms of at least one of pressure, amplitude, frequency, or temperature, based on the state of the actuators. For example, temperature can be controlled by incorporating a heater with the gas source, as discussed in the incorporated reference, while frequency could be determined by the intermittent open/closed state of valves. The present embodiments would be combined with the patent and application hereby incorporated by reference. This combination would provide for actuating the tactile representation of images for the visually impaired. Thus, the airbursts are referred to herein as "wixels," as in wind elements.

With respect to FIG. 9, the bilayer microvalve actuators and arrays as described herein would be placed proximal to each gas flow outlet 38, to control the gas flow through the outlets that contact a user's fingers. The actuator array could be fabricated integrally with the tactile tablet, according to the embodiments here, or the actuator array could be formed separately and added to a tactile tablet. Thus, persons having ordinary skill in the art will understand that components from the present embodiments, such as those reflected in FIGS. 1, 3A, 3B, 5A, and 5B, at least, can be combined with a tactile tablet device (a portion of which is shown in FIG. 9) in view of the teachings incorporated by reference from the material incorporated by heaters. In some embodiments, the microvalves with actuators are interior to the tablet 60 or otherwise covered by a protective screen to prevent damage by the fingers of the user.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A microvalve array for allowing or restricting a flow through a channel, comprising:
 a base comprising a substrate;
 a plurality of flow channels through the substrate, each having an inlet and outlet for the passage of a fluid flow;
 the plurality of flow channels being controlled by a plurality of valves; and
 a plurality of actuators, each actuator capable of existing in at least two states corresponding respectively with valve opening and at least partial valve closure;
 wherein one or more actuators is formed from a strained multilayer film comprising at least a first layer of material and a second layer of material, such that the first layer is compressive relative to the second layer to create a strain mismatch between layers, and at least one of the layers is electrically conductive;
 wherein the substrate forms an electrical circuit with one or more actuators' multilayer film such that applying voltage to the array causes at least one actuator to change from a first state corresponding with valve opening to a second state corresponding with at least partial valve closure, and wherein applying voltage is associated with unrolling the at least one actuator; and
 wherein the state of valve opening is characterized by any of the plurality of valves being completely open with the at least one actuator creating no obstruction of the flow.

2. The microvalve array of claim 1, further comprising a support positioned within at least one channel and maintaining electrical communication with the circuit, thereby dispersing the charge associated with unrolling the actuator.

3. The microvalve array of claim 1, wherein at least one actuator further comprises a free region and a separate anchor region, wherein the unrolling in response to applied voltage occurs in the free region while the anchor region remains immovably attached to the substrate.

4. The microvalve array of claim 3, wherein at least one actuator further comprises a shoulder positioned near an interface between the anchor region and the free region.

5. The microvalve array of claim 1, wherein at least one actuator further comprises at least one reinforcing member attached to the multilayer film.

6. The microvalve array of claim 5, wherein a plurality of reinforcing member are arranged parallel to one another in the direction the actuator unrolls.

7. The microvalve array of claim 1, wherein for at least one actuator, the percentage of valve closure varies linearly as a function of the voltage applied.

8. The microvalve array of claim 7, wherein at least one actuator will stably unroll to fully close the valve at an applied voltage maintained at about 60-70 V.

9. The microvalve array of claim 1, wherein the multilayer film for the at least one actuator is a bilayer film, and the materials for the bilayer are chosen from silicon carbide, silicon dioxide, polyimide, polysilicon, amorphous silicon, titanium, titanium tungsten, aluminum, and chromium.

10. The microvalve array of claim 1, wherein for at least one actuator, Young's modulus for the first layer is between 100 gigapascals (GPa) and 150 GPa, and for the second layer between 40 GPa and 85 GPa.

11. The microvalve array of claim 1, further comprising flow extensions for extending the flow channels beyond the substrate.

12. The microvalve array of claim 1, further comprising means for initiating a flow of gas or liquid, wherein in connection with said means at least one actuator causes a flow within at least one gas channel to vary according to at least one of pressure, amplitude, frequency, or temperature.

13. The microvalve of claim 1, wherein the at least one actuator is arranged to coil about a radial point which is common to both the first layer and second layer of the strained multilayer film.

* * * * *